United States Patent
Lee et al.

(10) Patent No.: US 8,341,742 B2
(45) Date of Patent: Dec. 25, 2012

(54) NETWORK ATTACK DETECTION DEVICES AND METHODS

(75) Inventors: Hahn-Ming Lee, Taipei (TW); Si-Yu Huang, Taipei (TW); Jerome Yeh, Taipei (TW); Ching-Hao Mao, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 306 days.

(21) Appl. No.: 12/837,986

(22) Filed: Jul. 16, 2010

(65) Prior Publication Data
US 2011/0185425 A1    Jul. 28, 2011

(30) Foreign Application Priority Data
Jan. 22, 2010    (TW) ................ 99101730 A

(51) Int. Cl.
*H04L 29/06* (2006.01)
(52) U.S. Cl. .......................... 726/23; 713/189
(58) Field of Classification Search .............. 726/23
See application file for complete search history.

(56) References Cited

U.S. PATENT DOCUMENTS

| 2005/0111384 A1* | 5/2005 | Ishihara et al. .............. 370/254 |
| 2008/0028463 A1* | 1/2008 | Dagon et al. .................... 726/22 |
| 2010/0050260 A1* | 2/2010 | Nakakoji et al. ................ 726/23 |

* cited by examiner

*Primary Examiner* — Edward Zee
*Assistant Examiner* — Yogesh Paliwal
(74) *Attorney, Agent, or Firm* — Wang Law Firm, Inc.; Li K. Wang; Stephen Hsu

(57) ABSTRACT

A network attack detection device is provided, including a spatial coordinate database for storing spatial coordinate data; a standard time zone database for storing standard time zone data; a domain name system packet collector for collecting a domain name system packet; a spatial snapshot feature extractor for extracting internet protocol address corresponding to the domain name system packet according to the domain name system packet, and generating spatial feature data corresponding to the internet protocol address according to the internet protocol address, the spatial coordinate data and the standard time zone data; and an attack detector for determining whether the domain name system packet is an attack according to the spatial feature data and a spatial snapshot detection model, and when determining that the domain name system packet is an attack, sending a warning to indicate the attack.

8 Claims, 8 Drawing Sheets

| answer section | |
| --- | --- |
| (A1) 69.146.38.156 | (A2) 75.45.165.219 |
| authority section | |
| (NS1) 66.165.197.187 (NS2) 210.123.24.9 | (NS3) 59.149.105.240 |

FIG. 2-1

| answer section | |
| --- | --- |
| (A1) (37.756, 128.896) | (A2) (42.366, -83.102) |
| authority section | |
| (NS1) (51.033, -93.833) (NS2) (33.548, -101.922) | (NS3) (34.042, -118.299) |

FIG. 2-2

NETWORK ATTACK DETECTION DEVICES AND METHODS

CROSS REFERENCE TO RELATED APPLICATIONS

This application claims priority of Taiwan Patent Application No. 099101730 filed on Jan. 22, 2010, the entirety of which is incorporated by reference herein.

BACKGROUND OF THE APPLICATION

1. Technical Field

The application relates to fast-flux domain name system (DNS) attacks, and more particularly, to network attack detection devices and methods for detecting a fast-flux domain name system attack.

2. Related Art

In 2007, a fast-flux domain name system (DNS) attack was discovered. The fast-flux domain name system (DNS) attack is different from conventional attacks because the fast-flux domain name system (DNS) attack can evade conventional blacklist mechanisms and can extend the time allotted for hacking. Fast-flux domain name system (DNS) attacks are mostly used by Botnet for malicious behavior such as spamming, phishing and malicious file download etc.

Current fast-flux domain name system (DNS) attack detection methods, detect fast-flux domain name system (DNS) attacks according to time delay information. Accordingly, when applied, delay detection problems may occur.

There are two types of fast-flux domain name system (DNS) attack detection methods which are based on different temporal characteristics. One is based on the information of internet protocol addresses. For example, there is a 99% accuracy rate when using the method, applying time to live (TTL) time differences, such as an autonomous system number (ASN), which correspond to internet protocol addresses and an AI method for automatic detection. However, delay detection problems occur.

The second method is based on the information of domain name systems (DNS) and internet protocol addresses. Since the TTL time of most malicious attacks is below three hours, accuracy rate may be increased by applying information of domain name systems, such as the application time of a domain name. The detection time is determined according to the TTL time of every domain name, and the waiting time is 1-3 hours. In addition, there is a 99% accuracy rate when also adding a naive Bayes classifier for automatic detection. However, delay detection problems also occur.

BRIEF SUMMARY OF THE APPLICATION

One aspect of the invention is to provide a network attack detection device for detecting a fast-flux domain name system attack, comprising: a spatial coordinate database for storing spatial coordinate data; a standard time zone database for storing standard time zone data; a domain name system packet collector for collecting a domain name system packet; a spatial snapshot feature extractor for extracting a plurality of internet protocol addresses corresponding to the domain name system packet according to the domain name system packet, and generating spatial feature data corresponding to the internet protocol addresses according to the internet protocol addresses, the spatial coordinate data and the standard time zone data; and an attack detector for determining whether the domain name system packet is an attack according to the spatial feature data and a spatial snapshot detection model, and when determining that the domain name system packet is an attack, sending a warning to indicate the attack, wherein the spatial feature data comprises time zone coordinate data and scatter degree data.

Another aspect of the invention is to provide a network attack detection method for detecting a fast-flux domain name system attack, comprising: collecting a domain name system packet; extracting a plurality of internet protocol addresses corresponding to the domain name system packet according to the domain name system packet; generating spatial feature data corresponding to the internet protocol addresses according to the internet protocol addresses, spatial coordinate data and standard time zone data; and determining whether the domain name system packet is an attack according to the spatial feature data and a spatial snapshot detection model, and when determining that the domain name system packet is an attack, sending a warning to indicate the attack, wherein the spatial feature data comprises time zone coordinate data and scatter degree data.

The advantage and spirit of the application may be better understood by the following recitations and the appended drawings.

BRIEF DESCRIPTION OF DRAWINGS

The application can be more fully understood by reading the subsequent detailed description and examples with references made to the accompanying drawings, wherein:

FIG. 2-1 is a schematic diagram illustrating the internet protocol addresses in an answer section and the internet protocol addresses in an authority section according to an embodiment of the invention.

FIG. 2-2 is a schematic diagram illustrating a spatial geographical coordinates corresponding to the internet protocol addresses in an answer section and the spatial geographical coordinates corresponding to the internet protocol addresses in an authority section according to an embodiment of the invention.

FIGS. 4-1 and 4-2 are schematic diagrams illustrating the relationship between time zone distributions corresponding to the spatial geographical coordinates and the entropy values according to an embodiment of the invention.

DETAILED DESCRIPTION

Figure 1:
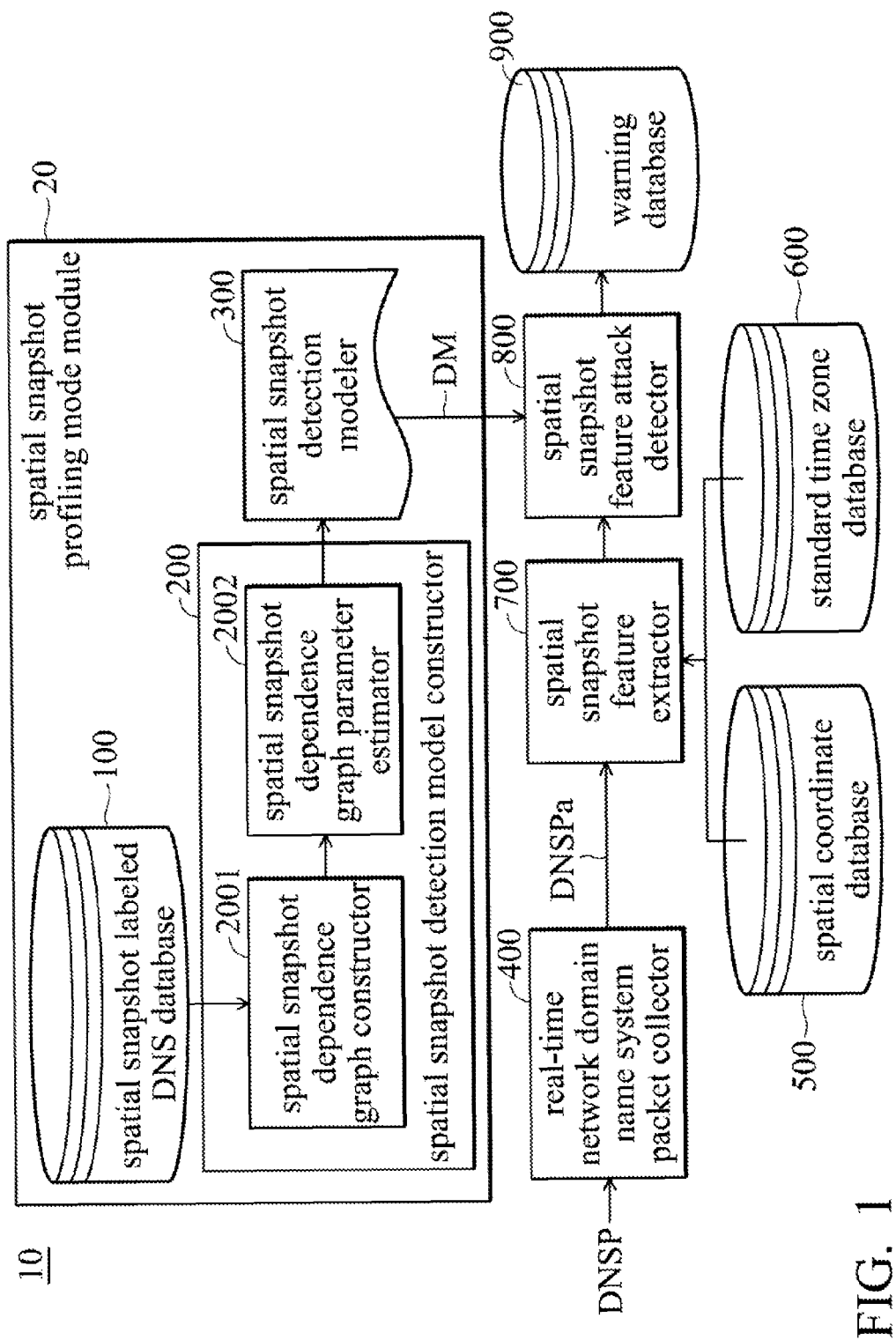
FIG. 1 is a block diagram illustrating a network attack detection device 10 for detecting a fast-flux domain name system attack according to an embodiment of the invention.

The following description could be a contemplated mode of carrying out the application. This description is made for the purpose of illustrating the general principles of the application and should not be taken in a limiting sense. The scope of the application is best determined by reference to the appended claims.

FIG. 1 is a block diagram illustrating a network attack detection device 10 for detecting a fast-flux domain name system attack according to an embodiment of the invention. The network attack detection device 10 comprises a real-time network domain name system packet collector 400, a spatial coordinate database 500, a standard time zone database 600, a spatial snapshot feature extractor 700, a spatial snapshot feature attack detector 800, a warning database 900 and a spatial snapshot profiling mode module 20. The real-time network domain name system packet collector 400 monitors a plurality of current real-time domain name system packets DNSP and collects a domain name system packet. DNSPa, wherein there are an answer section and an authority section in the domain name system packet DNSPa, and there are a plurality of internet protocol addresses in the answer section and the authority section, respectively.

Figures 2, 4:
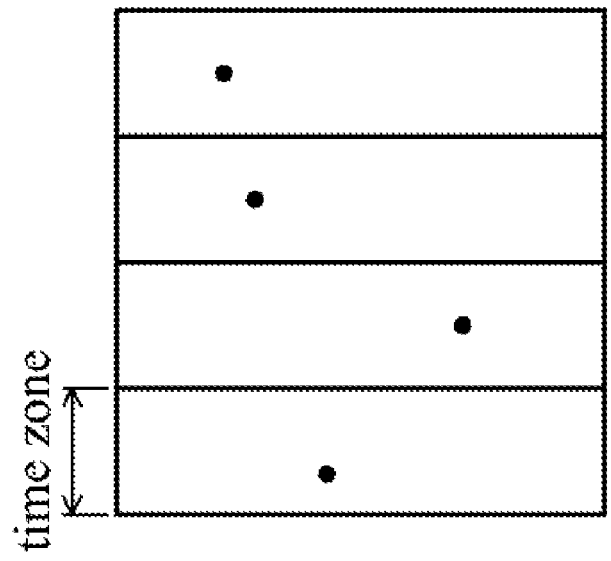
Figures 1, 4:
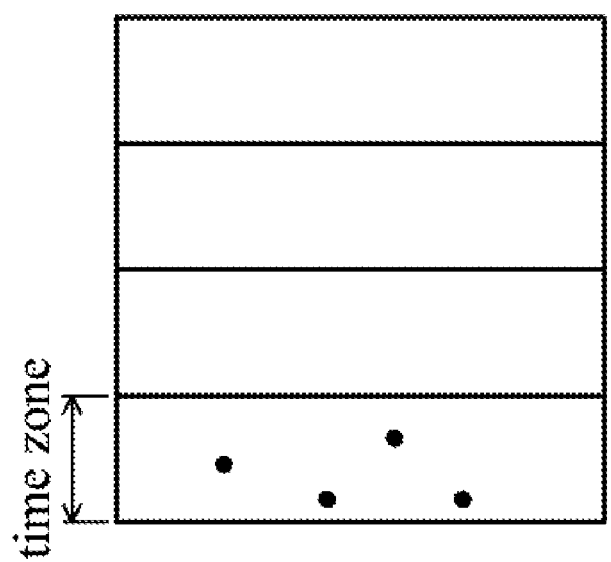

For example, as shown in FIG. 2, there are two internet protocol addresses (A1)-(A2) in the answer section and the two internet protocol addresses (A1)-(A2) are referred to as a first internet protocol address group. There are three internet protocol addresses (NS1)-(NS3) in the authority section and the three internet protocol addresses (NS1)-(NS3) are referred to as a second internet protocol address group.

The spatial coordinate database 500 stores spatial coordinate data, wherein the spatial coordinate data is data which comprises correspondence information between the internet protocol addresses and the spatial geographical coordinates. Therefore, an internet protocol address only corresponds to a longitude and latitude of a spatial geographical coordinate. As shown in FIG. 2-1 and FIG. 2-2, the internet protocol address (A1) is 69.146.38.156, and the spatial geographical coordinate of the internet protocol address (A1) corresponds to longitude 37.356 and latitude 128.896.

The standard time zone database 600 in the network attack detection device 10 stores standard time zone data, wherein the standard time zone data is data which comprises correspondence information between the spatial geographical coordinates and the time zone coordinate data. For example, the spatial geographical coordinate of the known interne protocol address (A1) is longitude 37.356 and latitude 128.896, and the time zone coordinate data corresponding to longitude 37.356 and latitude 128.896 is obtained according to the standard time zone data stored in the standard time zone database 600.

The spatial snapshot feature extractor 700 extracts the first internet protocol address group in the answer section and the second Internet protocol address group in the authority section corresponding to the domain name system packet DNSPa according to the domain name system packet DNSPa. The spatial snapshot feature extractor 700 generates the spatial feature data corresponding to the domain name system packet DNSPa according to the first internet protocol address group and the second internet protocol address group, the spatial coordinate data stored in the spatial coordinate database 500 and the standard time zone data stored in the standard time zone database 600, wherein the spatial feature data comprises time zone coordinate data and scatter degree data.

The spatial snapshot feature attack detector 800 determines whether the domain name system packet DNSPa is an attack or not according to the spatial feature data and a spatial snapshot detection model DM generated by the spatial snapshot profiling mode module 20. For example, the spatial snapshot feature attack detector 800 determines probability as to whether the domain name system packet DNSPa is an attack or is normal, and then determines whether the domain name system packet DNSPa is an attack or not according to the probabilities. When the domain name system packet DNSPa is an attack, a warning is output to indicate the attack. The warning database 900 receives the warning, wherein the warning comprises the spatial feature data of the domain name system packet corresponding to the attack and packet data such that network managers may use and analyze the data.

The spatial snapshot profiling mode module 20 in the network attack detection device 10 generates and provides the spatial snapshot detection model DM to the spatial snapshot feature attack detector 800 to determine whether the domain name system packet DNSPa is an attack. The spatial snapshot profiling mode module 20 comprises a spatial snapshot labeled DNS database 100, a spatial snapshot detection model constructor 200 and a spatial snapshot detection modeler 300.

The spatial snapshot labeled DNS database 100 stores a plurality of known DNS spatial feature data which is provided by an expert or detection result of the system. The spatial snapshot detection model DM is mainly profiled according to the data. The spatial snapshot detection model constructor 200 generates a dependence graph and conditional probability parameters corresponding to the known DNS spatial feature data according to the known DNS spatial feature data. The spatial snapshot detection modeler 300 generates the spatial snapshot detection model DM according to the dependence graph and the conditional probability parameters. Thus, the spatial snapshot detection model DM has a joint probability distribution table of the parameters of the spatial feature data.

Furthermore, the spatial snapshot detection model constructor 200 comprises a spatial snapshot dependence graph constructor 2001 and a spatial snapshot dependence graph parameter estimator 2002. The spatial snapshot dependence graph constructor 2001 generates the dependence graph corresponding to the known DNS spatial feature data according to the known DNS spatial feature data. The spatial snapshot dependence graph parameter estimator 2002 generates the conditional probability parameters according to the dependence graph and the known DNS spatial feature data. Then the dependence graph and the conditional probability parameters are output to the spatial snapshot detection modeler 300 to generate the spatial snapshot detection model DM.

FIG. 2-1 is a schematic diagram illustrating the internet protocol addresses in an answer section and the internet protocol addresses in an authority section according to an embodiment of the invention. In this exemplary, the answer section comprises two interne protocol addresses (A1)-(A2), and the internet protocol address (A1) is 69.146.38.156 and the internet protocol address (A2) is 75.45.165.219. The authority section comprises three internet protocol addresses (NS1), (NS1) and (NS3). The internet protocol address (NS1) is 66.165.197.187, the internet protocol address (NS2) is 210.123.24.9, and the internet protocol address (NS3) is 59.149.105.240.

FIG. 2-2 is a schematic diagram illustrating spatial geographical coordinates corresponding to the internet protocol addresses in an answer section and the spatial geographical coordinates corresponding to the internet protocol addresses in an authority section according to an embodiment of the invention. The spatial geographical coordinate of internet protocol address (A1) corresponds to longitude 37.356 and latitude 128.896. The spatial geographical coordinate of internet protocol address (A2) corresponds to longitude 42.366 and latitude −83.102. The spatial geographical coordinates of internet protocol addresses (NS1), (NS2) and (NS3) are, corresponds to (51.033,−93.833), (33.548,−101.922) and (34.042,−118.299), respectively, wherein the parameters x and y in (x,y) represent longitude and latitude, respectively.

Figure 3:
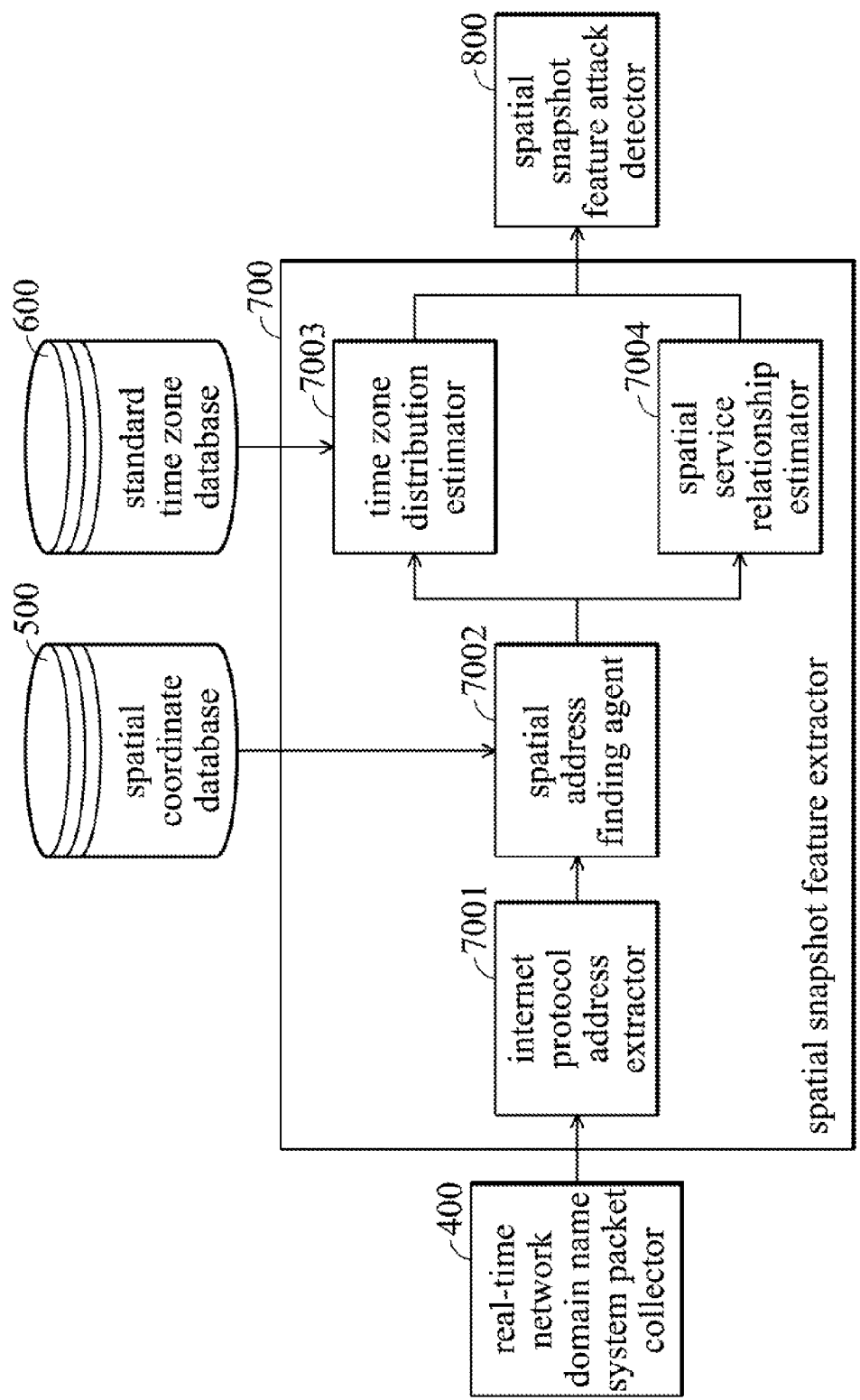
FIG. 3 is a block diagram illustrating a spatial snapshot feature extractor 700 according to an embodiment of the invention.

FIG. 3 is a block diagram illustrating a spatial snapshot feature extractor 700 according to an embodiment of the invention. The spatial snapshot feature extractor 700 comprises an internet protocol address extractor 7001, a spatial address finding agent 7002, a time zone distribution estimator 7003 and a spatial service relationship estimator 7004.

The internet protocol address extractor 7001 extracts the internet protocol addresses in an answer section and the authority section corresponding to the domain name system packet DNSPa according to the domain name system packet DNSPa. For example, the first internet protocol address group of the answer section in the domain name system packet DNSPa and the second internet protocol address group of the authority section in the domain name system packet DNSPa are extracted, as shown in the FIG. 2-1.

The spatial address finding agent 7002 generates spatial geographical coordinates corresponding to the internet protocol addresses according the internet protocol addresses and the spatial coordinate data. For example, a first spatial geographical coordinate group and a second spatial geographical coordinate group corresponding to the first internet protocol address group of the answer section in the domain name system packet DNSPa and second internet protocol address group of the authority section in the domain name system packet DNSPa, respectively, are located, as shown in the FIG. 2-2.

The time zone distribution estimator 7003 generates the time zone coordinate data corresponding to the spatial geographical coordinates according to the spatial geographical coordinates and the standard time zone data. For example, the first spatial geographical coordinate group corresponds to the first time zone coordinate group and the second spatial geographical coordinate group corresponds to the second time zone coordinate group, and time zone distribution of the first time zone coordinate group and the second time zone coordinate group is estimated by information theory. Time zone entropy provides spatial distribution quantification. As shown in the FIG. 4-1 and FIG. 4-2, the spatial distribution of the first and the second spatial geographical coordinate groups are defined by using the conception of entropy, respectively. The value of entropy is zero when all spatial geographical coordinates are in the same time zone. The value of entropy is larger than zero when all spatial geographical coordinates are in different time zones. However, the entropy setting in this example is not limiting.

Therefore, the entropy value of the answer section is obtained for the spatial distribution of the first spatial geographical coordinate group and the entropy value of the authority section is obtained for the spatial distribution of the second spatial geographical coordinate group. The time zone coordinate data is output to the spatial snapshot feature attack detector 800, wherein the time zone coordinate data comprises the entropy value of the answer section and the entropy value of the authority section.

The spatial service relationship estimator 7004 estimates variance and an average of spatial service relationship distances according to the first spatial geographical coordinate group and the second spatial geographical coordinate group to generate the scatter degree data, wherein the spatial service relationship distance is defined as the shortest distance between one of the first spatial geographical coordinate groups and all of second spatial geographical coordinate groups. As shown in the FIG. 5, the spatial service relationship distance MSD1 is defined as the shortest distance between the spatial geographical coordinate corresponding to the internet protocol address (A1) in the answer section and one of the spatial geographical coordinates corresponding to the internet protocol address (NS1)-(NS3) in the authority section. Furthermore, the spatial service relationship distance MSD2 is defined as the shortest distance between the spatial geographical coordinate corresponding to the internet protocol address (A2) in the answer section and one of the spatial geographical coordinates corresponding to the internet protocol address (NS1)-(NS3) in the authority section.

Therefore, the variance and average of the spatial service relationship distances MSD1 and MSD2 may be obtained. The scatter degree data is obtained according to the variance and an average of spatial service relationship distances MSD1 and MSD2. In other words, the variance and average are the scatter degree data, and then the scatter degree data is output to the spatial snapshot feature attack detector 800.

FIGS. 4-1 and 4-2 are schematic diagrams illustrating the relationship between time zone distributions corresponding to the spatial geographical coordinates and the entropy values according to an embodiment of the invention. The entropy value is zero when all spatial geographical coordinates are in the same time zone. The entropy value is larger than zero when all spatial geographical coordinates are in the different time zone. However, entropy setting in this example is not limiting. Therefore, the entropy value of the answer section is obtained according to the time zone distribution corresponding to the first spatial geographical coordinate group and the entropy value of the authority section is obtained according to the time zone distribution corresponding to the second spatial geographical coordinate group.

Figure 5:
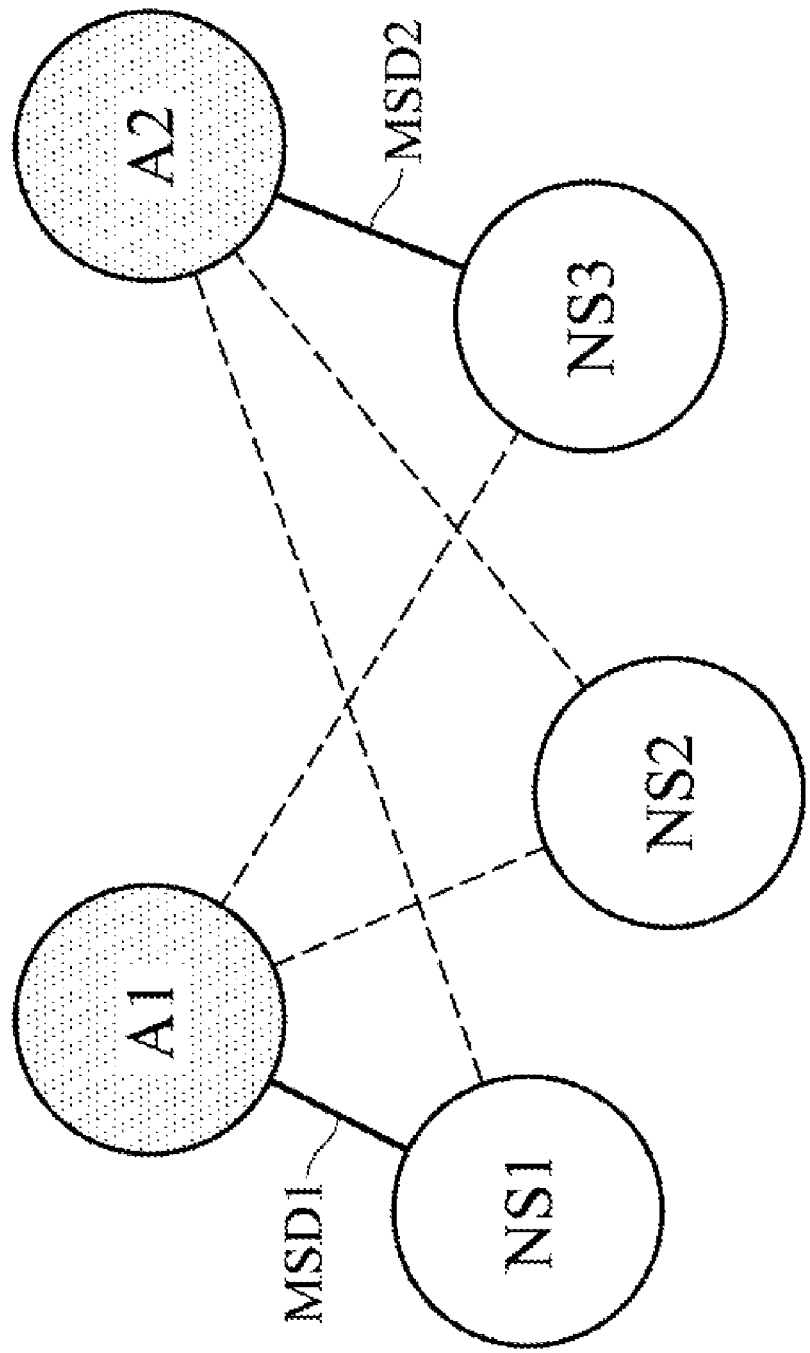
FIG. 5 is a schematic diagram illustrating a spatial service relationship distance between the spatial geographical coordinates in the answer section and the spatial geographical coordinates in the authority section according to an embodiment of the invention.

FIG. 5 is a schematic diagram illustrating a spatial service relationship distance between the spatial geographical coordinates in the answer section and the spatial geographical coordinates in the authority section according to an embodiment of the invention. FIG. 5 shows the spatial service relationship distance between the internet protocol address (A1) and the internet protocol addresses (NS1), (NS2) or (NS3), and shows the spatial service relationship distance between the internet protocol address (A2) and the internet protocol addresses (NS1), (NS2) or (NS3). Furthermore, the spatial service relationship distance is the shortest distance between the internet protocol address (A1) and one of the internet protocol addresses (NS1), (NS2) and (NS3) or between the internet protocol address (A2) and one of the internet protocol addresses (NS1), (NS2) and (NS3).

Therefore, the spatial service relationship distance MSD1 is defined as the distance between the internet protocol address (A1) and internet protocol address (NS1) and the spatial service relationship distance MSD2 is defined as the distance between the internet protocol address (A2) and internet protocol address (NS3).

Figure 6:
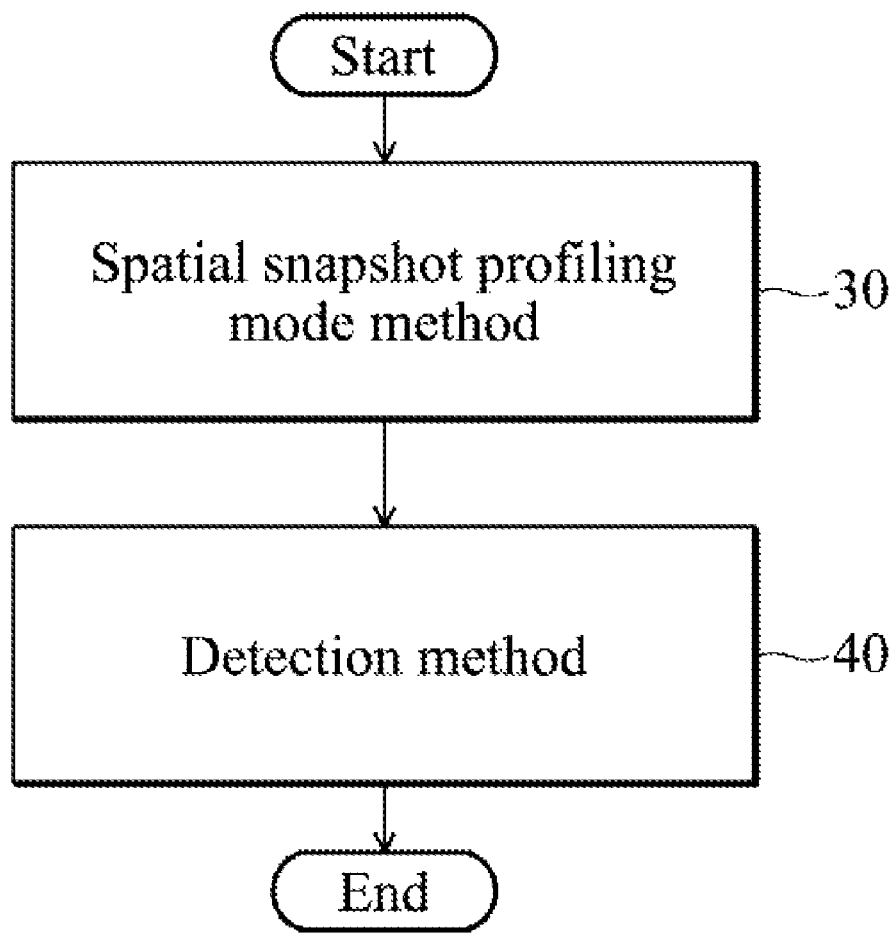
FIG. 6 is a flow chat illustrating a network attack detection method 60 according to an embodiment of the invention, wherein the network attack detection method 60 comprises a spatial snapshot profiling mode method 30 and a detection method 40.

FIG. 6 is a flowchart illustrating a network attack detection method 60 according to an embodiment of the invention, wherein the network attack detection method 60 comprises a spatial snapshot profiling mode method 30 and a detection method 40. The spatial snapshot profiling mode method 30 and the detection method 40 are described with reference to FIG. 7 and FIG. 8, respectively.

Figure 7:
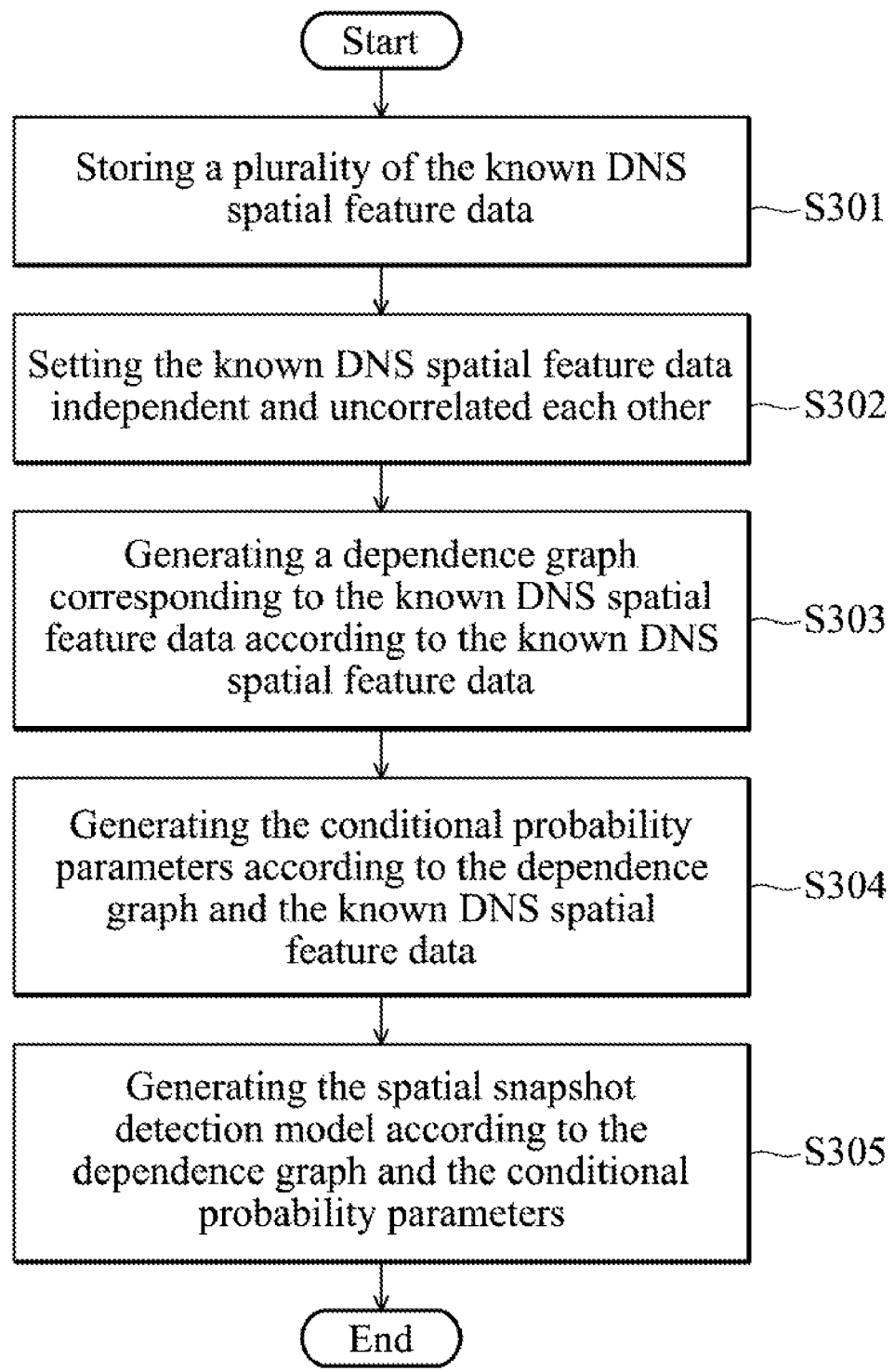
FIG. 7 is a flow chat illustrating a spatial snapshot profiling mode method 30 according to an embodiment of the invention.

FIG. 7 is a flow chat illustrating a spatial snapshot profiling mode method 30 according to an embodiment of the invention. The spatial snapshot profiling mode method 30 comprises storing a plurality of the known DNS spatial feature data (spatial feature data of some normal or attacked DNS) in step S301. Next, the spatial feature data is set independently and uncorrelated with each other in step S302. In step S303, a dependence graph is generated corresponding to the known DNS spatial feature data according to the known DNS spatial feature data, and the dependence graph is mainly constructed by a framework method in the mechanical domain such as K2 algorithm, TAN algorithm or HillClimber algorithm. Following the conditional probability parameters are generated according to the dependence graph and the known DNS spatial feature data, wherein the conditional probability parameters are estimated by a counting rule and a Laplace rule (step S304). In step S305, the spatial snapshot detection model DM is generated according to the dependence graph and the conditional probability parameters and the flow chat ends. When the spatial snapshot detection model DM has been generated, the detection method 40 is in accordance with the generated model.

Figure 8:
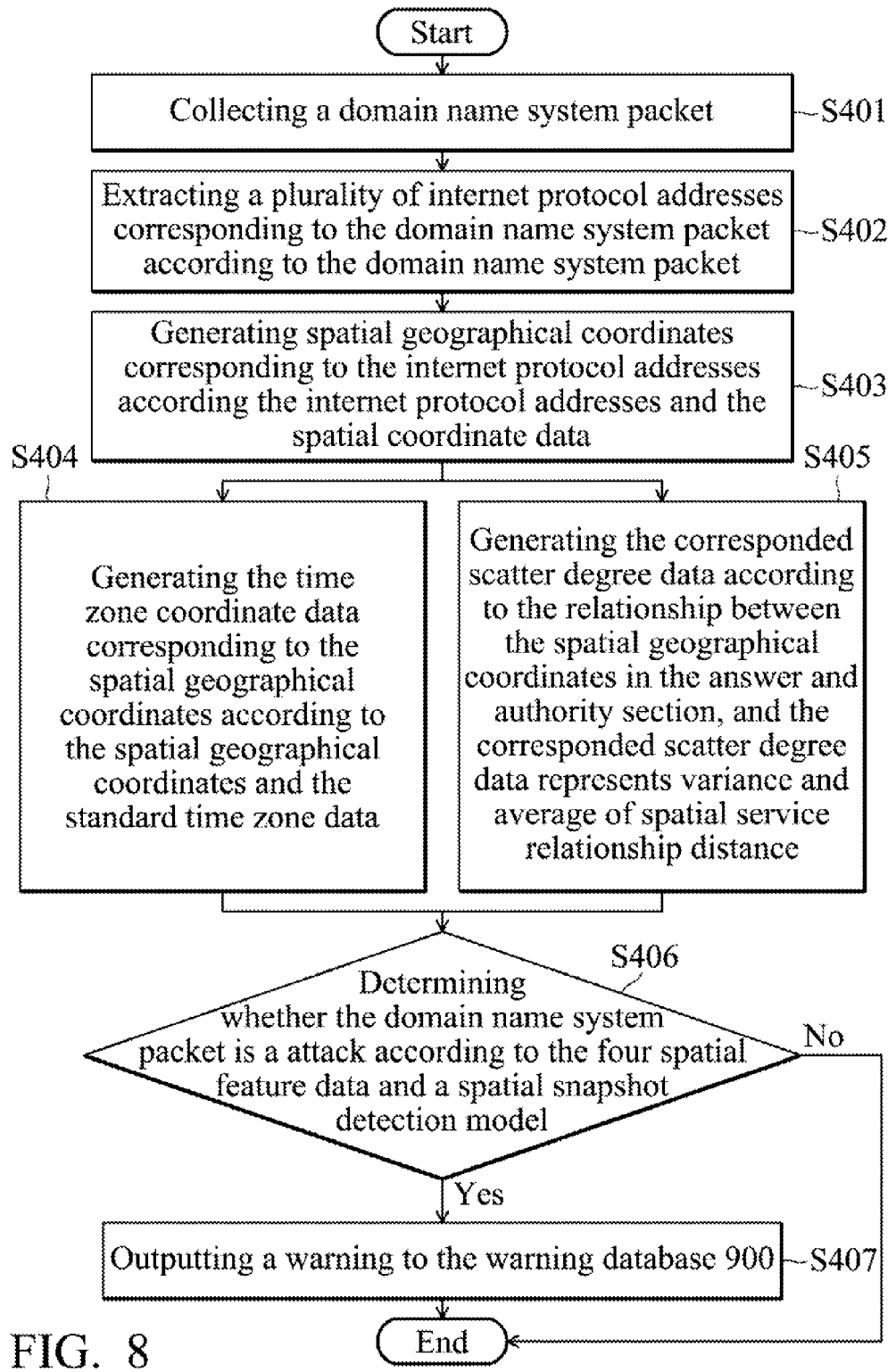
FIG. 8 is a flow chat illustrating a detection method 40 according to an embodiment of the invention.

FIG. 8 is a flow chat illustrating a detection method 40 according to an embodiment of the invention. The detection method 40 comprises collecting a domain name system packet in step S401, and in step S402, a plurality of internet protocol addresses corresponding to the domain name system packet are extracted according to the domain name system packet. In step S403, a plurality of spatial geographical coordinates corresponding to the internet protocol addresses are extracted according the internet protocol addresses and the spatial coordinate data. In step S404, the time zone coordinate data corresponding to the spatial geographical coordinates is generated according to the spatial geographical coordinates and the standard time zone data, obtaining the entropy values in the answer and authority sections. The entropy value in the answer section represents the time zone distribution corresponding to the internet protocol addresses in an answer section, and the entropy value in the authority section represents the time zone distribution corresponding to the internet protocol addresses in an authority section. In step S405, the corresponded scatter degree data is generated according to the relationship between the spatial geographical coordinates in the answer and authority section, and the corresponded scatter degree data represents variance and an average of spatial service relationship distances. Furthermore, in step S406, whether the domain name system packet is an attack is determined according to the obtained four spatial feature data (the entropy value in the answer section, the entropy value in the authority section and the variance and average of spatial service relationship distance) and a spatial snapshot detection model, and in step S407, when determining that the domain name system packet is an attack a warning to the warning database 900 is output, to complete the process.

With the example and explanations above, the features and spirit of the application are hopefully well described. Those skilled in the art will readily observe that numerous modifications and alterations of the embodiments may be made while retaining the teachings of the application. Accordingly, the above disclosure should be construed as limited only by the metes and bounds of the appended claims.

What is claimed is:

1. A network attack detection method for detecting a fast-flux domain name system attack, comprising:
   collecting a domain name system packet;
   extracting a plurality of internet protocol addresses corresponding to the domain name system packet according to the domain name system packet;
   generating spatial feature data corresponding to the internet protocol addresses according to the internet protocol addresses, spatial coordinate data and standard time zone data; and
   determining whether the domain name system packet is an attack according to the spatial feature data and a spatial snapshot detection model, and when determining that the domain name system packet is an attack, sending a warning to indicate the attack,
   wherein the spatial feature data comprises time zone coordinate data and scatter degree data,
   wherein the time zone coordinate data is generated by corresponding a first spatial geographical coordinate group and a second spatial geographical coordinate croup to a first time zone coordinate croup and a second time zone coordinate croup, respectively, according to the standard time zone data, and estimating time zone distribution of the first time zone coordinate group and the second time zone coordinate group by information theory.

2. The network attack detection method of claim 1, wherein extracting the internet protocol addresses further comprises:
   extracting the internet protocol addresses corresponding to the domain name system packet according to the domain name system packet;
   generating a plurality of spatial geographical coordinates corresponding to the internet protocol addresses according the internet protocol addresses and the spatial coordinate data;
   generating the time zone coordinate data corresponding to the spatial geographical coordinates according to the spatial geographical coordinates and the standard time zone data;
   generating the scatter degree data corresponding to the spatial geographical coordinates according to the spatial geographical coordinates; and
   outputting the time zone coordinate data and the scatter degree data to an attack detector.

3. The network attack detection method of claim 2, wherein the spatial coordinate data is data which comprises correspondence information between the internet protocol addresses and the spatial geographical coordinates.

4. The network attack detection method of claim 2, wherein the standard time zone data is data which comprises correspondence information between the spatial geographical coordinates and the time zone coordinate data.

5. The network attack detection method of claim 2, wherein the internet protocol addresses are extracted by extracting a first internet protocol address group in an answer section of the domain name system packet and a second internet protocol address group in an authority section of the domain name system packet according to the domain name system packet.

6. The network attack detection method of claim 2, wherein the spatial geographical coordinates are generated by corresponding a first internet protocol address group and a second internet protocol address group to the first spatial geographical coordinate group and the second spatial geographical coordinate group, respectively, according to the spatial coordinate data.

7. The network attack detection method of claim 2, wherein the scatter degree data is generated by estimating variance and an average of spatial service relationship distances according to a first spatial geographical coordinate group and a second spatial geographical coordinate group, wherein the spatial service relationship distance is defined as the shortest distance between one of the first spatial geographical coordinate groups and all of second spatial geographical coordinate groups.

8. The network attack detection method of claim 1, wherein the spatial snapshot detection model is generated according to a spatial snapshot profiling mode method.

* * * * *